United States Patent [19]

Owens et al.

[11] 4,148,846

[45] Apr. 10, 1979

[54] ACRYLIC MODIFIERS FOR POLYCARBONAMIDES

[75] Inventors: Frederick H. Owens, Wilingboro, N.J.; James S. Clovis, Warminster, Pa.

[73] Assignee: Rohm and Haas Company, Philadelphia, Pa.

[21] Appl. No.: 857,322

[22] Filed: Dec. 5, 1977

Related U.S. Application Data

[62] Division of Ser. No. 207,643, Dec. 13, 1971, Pat. No. 4,086,300, which is a division of Ser. No. 71,228, Sep. 10, 1970, Pat. No. 3,668,274.

[51] Int. Cl.$^2$ ............................................. C08L 31/02
[52] U.S. Cl. .............................. 260/885; 260/23 AR; 260/23.7 N; 260/31.8 M; 260/31.8 N; 260/31.8 DR; 260/37 N; 260/42.13; 260/42.21; 260/42.22; 260/42.29; 260/42.37; 260/45.7 P; 260/857 D; 260/857 G; 260/877; 260/45.8 R; 260/45.85 A; 260/45.95 R
[58] Field of Search ................................ 260/885, 877

[56] References Cited

U.S. PATENT DOCUMENTS

| | | | |
|---|---|---|---|
| 3,244,655 | 4/1966 | Sullivan et al. | 260/885 |
| 3,793,402 | 2/1974 | Owens | 260/885 |

*Primary Examiner*—J. Ziegler
*Attorney, Agent, or Firm*—Michael B. Fein

[57] ABSTRACT

An impact resistant nitrogenous polymer comprises a multiphase amine-reactive moiety-containing polymer grafted to a polycarbonamide containing recurring amide linkages as anintegral part of the polymer chain; the grafting, by reaction of an amine-reactive moiety of the polymer with an amine end group of the polycarbonamide. Preferably the amine-reactive moiety-containing polymer is a multiphase carboxylic acid-containing polymer comprising (A) a first elastomer phase that is preferably polymerized from monomers comprising: 50 to 99.9 parts by weight alkyl acrylate wherein the alkyl group contains 1 to 15 carbon atoms, butadiene or substituted butadiene; 0 to 40 parts by weight of other ethylenically unsaturated monomers; 0 to 5 parts by weight of a polyethylenically unsaturated crosslinking monomer; and 0 to 5 parts by weight of a graft-linking monomer; and (B) a final rigid thermoplastic stage containing amine-reactive carboxylic acid groups and polymerized from monomers comprising, 1 to 50 parts by weight of a copolymerizable carboxylic acid; 50 to 99 parts by weight of a member selected from the group consisting of alkyl methacrylates, styrenes, acrylonitrile, methacrylonitrile and olefins that, when homopolymerized, form polymers having a heat distortion temperature greater than about 20° C.; 0 to 49 parts by weight of another acrylic monomer; and 0 to 40 parts of another copolymerizable ethylenically unsaturated monomer. The impact resistant nitrogenous polymer is characterized by superior hot strength that renders the polymer extrudable, blow moldable, and injection moldable.

1 Claim, No Drawings

ACRYLIC MODIFIERS FOR POLYCARBONAMIDES

Division of Ser. No. 207,643, Dec. 13, 1971, U.S. Pat. No. 4,086,300; which is a division of Ser. No. 71,228, Sept. 10, 1972, U.S. Pat. No. 3,668,274.

This invention relates to modified polycarbonamide compositions of improved properties. U.S. Pat. Nos. 3,099,631, Tanner, July 30, 1963, and 3,394,385, Froehlich, July 30, 1968, disclose a nitrogenous polymer containing carboxylic acid groups within the polymer chain, bonded by carbon-to-carbon linkages to a catenarian carbon, i.e. a non-carboxylic carbon attached to a nitrogen, and the acid groups so linked being at least one carbon atom removed from the catenarian carbon. The carboxylic acid groups are used in the form of their salts. The resulting polymers are used in shaped articles particularly fibers characterized by improved melt resistance, low static propensity and improved wet crease recovery.

U.S. Pat. No. 3,297,471, Traumann, Jan. 10, 1967, shows shaped structures, particularly yarns, fibers, fabrics, films, flakes or the like, formed by penetrating a polyamide with a polymerizable acid vinyl compound and polymerizing the compound to the polyamide by reaction of the vinyl group. The salt of the acid group of the compound is then formed and the resulting composition used in applications where thermal and static properties are of importance.

In the present invention, a polycarbonamide is modified by a multistage, amine-reactive moiety-containing polymer to render the polycarbonamide extrudable, blow moldable and injection moldable and otherwise amenable to the application of forming processes. Furthermore, the modified carbonamides of this invention are characterized by increased impact strength and by modulus values essentially equal to or better than the unmodified polycarbonamide. The advantageous improved properties of the modified polycarbonamide are obtained without significant affect on other desirable properties of the unmodified polycarbonamide such as solvent resistance and vapor barrier properties.

In one embodiment, the present invention relates to the multiphase amine-reactive moiety-containing modifier itself as a novel composition of matter. The modifier is a multi-phase elastomer-based interpolymer in which the outer rigid phase contains amine-reactive moieties, preferably uncombined carboxylic acid groups, that can be reacted with the amine end groups of the polycarbonamide. The modifier comprises a first phase elastomeric polymer selected from the group consisting of the homopolymers and copolymers of an alkyl acrylate wherein the alkyl group contains 1 to 15 carbon atoms, butadiene, substituted butadiene, urethanes, ethers, esters, and ethylene; and a final rigid thermoplastic polymeric phase containing amine-reactive moieties. Preferably the modifier comprises: (A) a first elastomer phase that is preferably polymerized from monomers comprising: 50 to 99.9 parts by weight alkyl acrylate wherein the alkyl group contains 1 to 15 carbon atoms, butadiene or substituted butadiene; 0 to 40 parts by weight of other ethylenically unsaturated monomers; 0 to 5 parts by weight of a polyethylenically unsaturated crosslinking monomer; and 0 to 5 parts by weight of a graft-linking monomer; and (B) a final rigid phase thermoplastic stage containing amine-reactive moieties, preferable carboxylic acid groups, and polymerized from monomers comprising: 1 to 50 parts by weight of a copolymerizable amine-reactive moiety-containing monomer, preferably a copolymerizable carboxylic acid; 50 to 99 parts by weight of a member selected from the group consisting of alkyl methacrylates, styrenes, acrylonitrile, methacrylonitrile and olefins that, when homopolymerized, form polymers having a heat distortion temperature greater than about 20° C.; 10 to 49 parts by weight of another acrylic monomer; and 0 to 40 parts of another copolymerizable ethylenically unsaturated monomer.

The reactive groups of the modifier are reacted with the amine end groups of the polycarbonamide to form a grafted modifier-polycarbonamide containing recurring amide linkages as an integral part of the polymer chain; the grafting by reaction of a reactive group, preferably an acid group of the modifier, with an amine end group of the polycarbonadmide. The preferred modifier content based on the total weight of the modified polymer is 2.5 to 30 percent. Most preferred is 4 to 15 percent.

The present invention also relates to a process for making the modified polycarbonamide comprising forming a first elastomeric phase of a polymer selected from the group consisting of the homopolymers and copolymers of an alkyl acrylate wherein the alkyl group contains 1 to 15 carbon atoms, butadiene, substituted butadiene, urethane, ethers, esters, and ethylene; forming an amine-reactive moiety-containing final rigid thermoplastic phase in the presence of a product containing the first elastomeric phase; and reacting a reactive moiety of the resulting polymer with an amine end group of a polycarbonamide polymer containing recurring amide linkages as an integral part of the polymer chain to form a modified interpolymer of improved impact strength. Preferably the process comprises: (A) forming a first elastomeric phase by polymerization of a monomer charge of 50 to 99.9 parts by weight of alkyl acrylate wherein the alkyl group contains 1 to 15 carbon atoms, butadiene or substituted butadiene; 0 to 40 parts by weight of ether ethylenically unsaturated monomers; 0 to 5 parts by weight of a polyunsaturated crosslinking monomer; and 0 to 5 parts by weight of a graft-linking monomer; (B) polymerizing in the presence of a product containing the elastomeric phase formed in (A), a monomer charge of 1 to 50 parts by weight of a copolymerizable amine-reactive moiety-containing monomer, preferably a copolymerizable carboxylic acid; 50 to 99 parts by weight of a member selected from the group consisting of alkyl methacrylates, styrenes, acrylonitrile, methacrylonitrile and olefins that, when homopolymerized, form polymers having a heat distortion temperature greater than about 20° C.; 0 to 49 parts by weight of another acrylic monomer; and 0 to 40 parts of another copolymerizable ethylenically unsaturated monomer to form a multiphase carboxylic acid-containing polymer; and (C) reacting a copolymerizable amine-reactive moiety of the polymer product of (A) and (B) with an amine end group of a polycarbonamide polymer containing recurring amide linkages as an integral part of the polymer chain to form a modified polymer-polycarbonamide of improved impact strength.

The polycarbonamides suitable in the present invention include those that are amine-terminated and are capable of reacting with the carboxylic acid-containing modifiers at this termination. Examples of suitable polycarbonamides are those prepared from polymerizable monoamino monocarboxylic acids or their amide-forming derivatives, or from suitable diamine and suitable dicarboxylic acids or from amide-forming derivatives of these compounds. The preferred polyamides are those wherein the intracarbonamide linkages are other than exclusively aromatic, i.e., there is at least 1 aliphatic —HCR— group in each repeating unit of the polymer molecule. The —R— group may be hydrogen, halogen, monovalent organic radical, alkylene or the like. Typical of such polyamides are those formed from an aliphatic diamine and an aliphatic acid containing the repeating unit

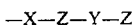

wherein —X— and —Y— represent divalent aliphatic or cycloaliphatic groups and —Z— represents the

linkage. Polyhexamethyleneadipamide and polycaproamide (i.e., "66" and "6" nylons) are typical. Other suitable polyamides are those having the repeating structure —A—Z—X—Z where —A— is a divalent aromatic radical and —X— and —Z— are as previously defined. Polyhexamethylene terephthalamide is illustrative of such polymers. Additionally polyamides having repeating units such as —A—Z—B—Z— and —X—Z—B—Z— wherein —B— is divalent alkaryl (such as xylene may be used. Another class of suitable polyamides containing other than aromatic intracarbonamide repeating units are those prepared from piperazine, such as those from piperazine and adipic acid, piperazine and terephthalic acid, and the like. Copolyamides, condensation copolymers wherein the amide linkage is the predominant linkage and polyamide mixtures are also useful. In one aspect of the present invention the polycarbonamide is "waste" or "scrap" nylon flock.

The acrylic modifier of this invention is an elastomer-based composite interpolymer material having a first phase of an elastomer and subsequent phases which are, at least in part, chemically linked to the elastomer core; these subsequent phases may be elastomeric or rigid thermoplastic or a combination of the two; but the final phase is a rigid thermoplastic containing copolymerized acid.

The composite interpolymer material is ordinarily and preferably prepared by emulsion polymerization of the elastomer as a discrete phase from a monomer mix of at least about 50 weight percent alkyl and/or aralkyl acrylate, butadiene or substituted butadiene and one or more of polyethenically unsaturated crosslinking monomers and graftlinking monomers. The elastomer may also be a polyurethane, polyether, polyethylene and other elastomer well known in the art which can be dispersed in a medium such that subsequent phases may be added.

Upon completion of the polymerization of the elastomeric phase, i.e. substantial exhaustion of the monomers in the initial polymerization mix, the subsequent phases are then added in such a fashion that substantially all the subsequent stages are formed at the surface of the previous stage. The attachment of the subsequent stages to the elastomeric phase may be physical or chemical and includes graft copolymerization.

Preferred are those elastomers which have a glass temperature less than 25° C. More preferred are those elastomers having a glass temperature less than −25° C.

In all cases these glass temperatures refer to the elastomeric portion of the modifier only and do not include any subsequent phases or other polymers attached physically or chemically onto or into the particles of the elastomer.

The elastomers of this invention include acrylic interpolymers comprising 50 to 99.9 parts by weight alkyl acrylate monomers, wherein the alkyl group contains 1 to 15 carbon atoms, preferably 1 to 8 and most preferably 2 to 8 carbon atoms, 0 to 40 parts by weight of ether ethylenically unsaturated monomers, 0.1 to 5 parts by weight of at least one polyunsaturated crosslinking monomer, and 0 to 5 parts by weight of a graft-linking monomer. Preferred are those acrylic elastomers wherein the interpolymer comprises 50 to 90 parts by weight alkyl acrylate monomers, wherein the alkyl group contains 1 to 8 carbon atoms, 0 to 20 parts by weight other acrylic monomers, 5 to 20 parts by weight other ethylenically unsaturated monomers, as defined below, 0.1 to 1.0 parts by weight of at least one polyethylenically unsaturated crosslinking monomer unit, and 0.1 to 1.0 parts by weight of graft-linking monomer. Other acrylic monomers including aralkyl esters of acrylic acid wherein the cyclic portion contains 5, 6 or 7 carbon atoms with or without an additional alkyl bridge, and the alkyl portion of the aralkyl group contains up to 15 carbon atoms may also be used; substituted acrylates or methacrylates includng alkylthioalkyl acrylates such as ethyl thioethyl acrylate, and the like, alkoxyalkyl acrylates such as methoxyethyl acrylate, and the like, can also be used. Also included in this group are hydroxy alkyl, haloalkyl, cyanoalkyl, nitroalkyl, and the like, acrylates and methacrylates, acrylamide, methacrylamide and alkyl acrylamides and methacrylamides.

Suitable other ethylenically unsaturated monomers include styrene, α-methylstyrene, vinyl and vinylidene halides, vinyl ethers, amides, ethers, and the like.

The acrylic elastomers include polyfunctional unsaturated monomers capable of cross-linking the elastomer, such as polyethylenically unsaturated monomers like polyacrylates and polymethacrylates, and monomers capable of ionic and coordinate crosslinking such as acid groups and organic and inorganic bases and other electron donating groups co-ordinating with suitable electrophilic agents. The cross-linked elastomers are referred to as gelled interpolymers to describe that physical characteristic of the polymers. The polyethylenically unsaturated monomers include polyacrylic and polymethacrylic esters of polyols such as butylone diacrylate and dimethacrylate, trimethylolpropane trimethacrylate, and the like, di- and trivinyl benzene, vinyl acrylate and methacrylate and other cross-linking monomers.

The graft-linking monomers contemplated in the present invention are similar to the cross-linking monomers hereinbefore described, but where the cross-linking monomers, as that term is commonly employed and as it is utilized herein, have a plurality of addition polymerizable unsaturated groups, each of which participate in the polymerization reaction at about the same rate as one another and as the primary monomers, i.e, the alkyl acrylate monomers, the other acrylic monomers, and the reactive other monomers, the graft-linking monomers in the present invention are compounds having two or more addition polymerizable unsaturated reactive groups which participate in the polymerization reaction at substantially different rates. It is preferred to include compounds where at least one reactive group polymerizes at about the same rate, or slightly slower than the other monomers, while the remaining reactive group or groups polymerize at a substantially different, e.g., slower, rate. The differential polymerization rates result in a residual level of unsaturation in the elastomeric phase, particularly during the latter stages of polymerization and, consequently, at or near the surface of the elastomer particles. When the rigid thermoplastic phase is subsequently polymerized at the surface of the elastomer, the residual unsaturated additional polymerizable reactive groups contributed by the graft-linking monomer participate in the subsequent reaction so that at least a portion of the following stage or stages particularly the rigid phase is chemically attached to the surface of the elastomer.

The compounds particularly preferred for use as graft-linking monomers in the present invention are allyl methacrylate and allyl acrylate. Other compounds suitable for use as graft-linking monomers in the present invention include, by way of example, allyl, methallyl, and crotyl esters of acrylic acid, methacrylic acid, maleic acid (mono- and di-esters); fumaric acid (mono- and di- esters) and itaconic acid (mono- and di- esters); allyl, methallyl and crotyl vinyl ether; alyl, methallyl, and crotyl vinyl thioether; N-allyl, methallyl or crotyl maleimide; vinyl esters of 3-butenoic and 4-pentenoic acids; triallyl cyanurate; o-allyl, methallyl or crotyl, o-alkyl, aryl, alkaryl or aralkyl p-vinyl, -allyl, or -methallyl phosphonate, triallyl, trimethallyl or tricrotyl phosphate; o-vinyl, o,o-dialkyl, dimethallyl or dicretyl phosphate, cycloalkenyl esters of acrylic acid, methacrylic acid, maleic acid (mono- and di- esters), fumaric acid (mono- and di- esters), itaconic acid (mono- and di- esters), such as 2; 3; or 4-cyclohexenyl acrylate, bicyclo (2,2,19 hept-5-ene-2-yl esters of acrylic acid, methacrylic acid, maleic acid (mono- or di- esters), fumaric acid (mono- and di- esters) and itaconic acid (mono- amd di- esters); vinyl ethers and vinyl thioethers of cycloalkenols and cycoalkene thiols such as vinyl cycohex-4-ene-1-yl ether, vinyl ether of bicyclo (2,2,1) hept-5-ene-2-el, vinyl esters of cycoalkene carboxylic acids such as vinyl cycohex-3-ene-1-carboxylic acid or vinyl bicyclo (2,2,1) hept-5-ene-2-carboxylate.

Among the effective graft-linking monomers, allyl group containing compounds are preferred, particularly allyl esters of ethylenically unsaturated acids. Most preferred are allyl acrylate, allyl methacrylate, diallyl maleate, diallyl fumarate, diallyl itaconate, allyl acid maleate, allyl acid fumarate, and allyl acid itaconate. Another category of allyl compounds which are highly effective, but not so preferred as the foregoing materials, as the diallyl esters of polycarboxylic acids which do not contain polymerizable unsaturation. Where two or more allyl groups occur in a single compound, one will tend to polymerize with substantially greater ease than another.

The diene elastomers of the present invention include polybutadiene or similar compounds such as polyisoprene, polychloroprene and poly (cyanobutadiene). The diene may be copolymerized with or without other monomers such as alkyl and aralkyl acrylates and methacrylates, other acrylic monomers and other ethylenically unsaturated monomers as listed above under acrylic elastomers. These elastomers may contain crosslinking monomers and graft-linking monomers as listed above. Preferred are those elastomers which contain 50 to 100 parts by weight diene, 0 to 50 parts by weight acrylic monomer, 0 to 50 parts other ethylenically unsaturated monomer, 0 to 2 parts cross-linking monomer and 0 to, 1 parts graft-linking monomer. These elastomers may be prepared in bulk, in emulsion, or in solution, and again may be prepared sequentially with different combinations of the above monomers or different concentrations of the above monomers. The elastomers may have attached to them subsequent stages which may be considered rigid, chosen as to amount and composition so as to provide dispersibility and compatibility with subsequent stages or with the polycarbonamide to be modified or to prevent the penetration of monomer into the elastomer. These elastomers may contain transfer agents in either one or all phases.

The polyester-urethane elastomers are prepared from a diisocyanate compound and one or more compounds containing active hydrogen functionality, one of which is a polyester. Examples of polyester-urethane elastomers include elastomers prepared by isocyanates, both of the aliphatic and aromatic types, a saturated or unsaturated polyester, preferably a hydroxyl-terminated polyester, and optionally other active hydrogen-containing compounds including alkane diols, both saturated and unsaturated, hydroxyalkyl esters of acrylic and methacrylic acid, and the like. These elastomers are commonly prepared in bulk or in solution.

Polyether-urethane elastomers may be used in this invention. These elastomers are similar to the polyester-urethane elastomers except for the inclusion of the polyether. Generally, hydroxyl-terminated polyethers are utilized along with other active hydrogen-containing compounds, either saturated or unsaturated. Polyester elastomers may also be used in this invention. These polyesters are generally prepared from aliphatic diacids of either the saturated or unsaturated variety and aliphatic diols. Acrylonitrile and methacrylic acid as well as other compounds may be included for the maximum development of impact strength.

Ethylene-propylene-diene rubbers which have been converted into aqueous emulsion by known techniques can also be used as elastomers.

The preferred elastomer content of the multiphase polymer is 50 to 90%, most preferred is 60 to 80%. The outer rigid phase is comprised of a rigid thermoplastic containing a copolymerizable acid.

The elastomer-containing amine-reactive moiety-containing polymer may be prepared by bulk, suspension, emulsion, or solution polymerization procedures. The polymers may be prepared in sequential stages under conditions to provide physical and/or chemical attachment between the stages. The stages may be of varying hardness and may range from the softest elastomer to the hardest rigid phase to provide improved handling characteristics and processability. These intermediate stages may also serve as a barrier to the penetration of subsequent monomer additions into the elastomer. The polymer may contain chain transfer agents in either one or all of the phases.

The monomers used for the rigid thermoplastic portion include a majority (e.g., 50–99%) of alkyl methacrylate, styrene, α-methylstyrene, halostyrene, acrylonitrile, methacrylonitrile, and olefins which polymerize to give polymers having a heat distortion temperature greater than about 20° C., preferably greater than 50° C. The rigid thermoplastic portion of this phase includes homopolymers or copolymers of alkyl methacrylates wherein the alkyl group contains 1 to 15, preferably 1 to 8 carbon atoms. The rigid thermoplastic phase may contain one or more acrylic comonomers in quantities of 0 to 49 parts such as other alkyl and aryl methacrylates, alkyl and aryl acrylates, alkyl and aryl acrylamides, substituted alkyl and aryl methacrylates and acrylates such as halogen, alkoxy, alkylthio, cyanoalkyl, amino, alkylthiol esters, and other substitutions, and may contain 0 to 40 parts of other unsaturated monomers including vinyl esters, vinyl ethers, vinyl amides, vinyl ketones, vinyl halides, vinylidene halides and olefins.

Typical of the monomers which may be used to prepare the hard phase are esters of acrylic and methacrylic acid such as methyl, ethyl, n-propyl, isopropyl, n-butyl, isobutyl, 2-ethylhexyl, stearyl, cyclohexyl, isobornyl, bornyl, fenchyl, norbornyl, adamantyl, benzyl, phenyl and the like. Preferred are those alkyl esters of methacrylic and acrylic acids wherein the alkyl group contains 1 to 4 carbon atoms. The preferred cycloalkyl esters of methacrylic and acrylic acids have cycloalkyl groups containing 4 to 14 carbon atoms. The substituted esters of methacrylic acid and acrylic acid include chlorine and bromine substituted lower alkyl esters; alkoxy substituted lower alkyl esters such as ethoxy and methoxy; alkylthio substituted lower alkyl esters such as ethylthio and methylthio; and cyanoalkyl substituted lower alkyl esters such as cyanoethyl and the like. Styrene monomers include halostyrenes, vinyl toluene, t-butyl styrene, α-methylstyrene, and the like. Vinyl halides and vinylidene halides wherein halides include chloride, bromide, and fluoride, and olefins including ethylene, propylene, isobutylene and the like, can also be utilized.

The copolymerizable amine-reactive moiety-containing compounds used in the outer rigid thermoplastic phase are those compounds containing groups which can react with the amine groups in the polycarbonamide to form covalent bonds under the conditions of the blending described below; such reactive groups include acids, anhydrides, epoxides, oxetanes, halides, isocyanates, isothiocyanates, etc. or groups which convert to amine reactive moieties under the blending conditions cited below. Preferably the amine-respective moiety-containing compound is a carboxylic acid. Useful carboxylic acids include acrylic methacrylic, itaconic, fumaric maleic, citraconic, α-methylene glutaric, aconitic, maric maleic, mesaconic acids and substituted acrylic acids such as α-hydroxymethyl- or α-halomethyl acrylic acids as well as acids such as methacryloxypropionic acid, acryloxy- or methacryloxyisopropyl acid phthalate, acryloxy- or methacryloxy- ethyl or isopropyl acid oxalate, maleate, succinate, glutrate, and the like. The preferred acid content in the interpolymer is 1 to 25 weight percent, most preferred is 5 to 10 weight percent. Although the amine-reactive moiety-containing compound, e.g. the carboxylic acid compound, is preferably found in the outer rigid thermoplastic phase, it may be found in any of the stages of the multiphase polymer including the first elastomeric phase so long as the reactive groups are substantially free to react with the amines of the polycarbonamide.

The composite interpolymers of the present invention are prepared by suspension or emulsion polymerization procedures utilizing a multi-stage, or sequential technique. In simplest form the elastomeric phase is formed in a first stage and the rigid thermoplastic phase is formed in a second stage. Either the elastomeric or rigid phases can themselves also be sequentionally polymerised. The monomers of the initial stage, together with initiators, soap or emulsifier, polymerization modifiers and chain transfer agents and the like are formed into the initial polymerization mix and polymerized, e.g., by heating and mixing the emulsion, in well known and wholly conventional fashion, until the monomers are substantially depleted. Monomers of the second, and, in turn, of each additional stage are then added with appropriate other materials, e.g., initiator, soap, and the like, so that the desired polymerization of each stage occurs in sequence to substantial exhaustion of the monomers. In each stage subsequent to the first, the amounts of initiator and soap, if any, are maintained at a level such that polymerization occurs at the surface of existing particles, and no substantial number of new particles, or "seeds" form in the emulsion. The stages can vary in hardness, from a very soft elastomer first stage seed to the hardest rigid thermoplastic. Both the elastomer and the rigid thermoplastic can contain transfer agents, in one or all stages, and any or all of the stages of the composite can contain polyfunctional crosslinking monomers.

When polymerizations are conducted in multi-stage, sequential processes, there can additionally be stages which are, in composition and proportions, a combination of the two distinct phases, and having properties which are intermediate there-between.

Polymerization is conducted in accordance with known techniques for effecting emulsion or suspension polymerization, with the use of conventional materials, including, for example, free-radical initiators, soaps and emulsifiers, modifiers of numerous types, and the like.

The polymerization reactions can be initiated by either thermal or redox-type initiator systems. Examples of thermal initiators include the organo peroxides, such as benzoyl peroxide, substituted benzoyl peroxides, acetyl peroxide, lauryl peroxide, t-butyl hydroperoxide, di-t-butyl peroxide; peresters, such as t-butyl peroxypivalate; azo-type initiators, such as azo-bis-isobutyronitrile; persulfates, such as sodium, potassium, or ammonium persulfate; and peroxyphosphates, such as sodium, potassium, or ammonium peroxyphosphate. Redox initiators include, for example, a combination of a hydroperoxide, such as hydrogen peroxide, t-butyl hydroperoxide, cumene hydroperoxide, diisopropyl benzene hydroperoxide and the like, and a reducing agent, such as sodium, potassium or ammonium bisulfite, metabisulfite, or hydrosulfite, sulfur dioxide, hydrazine, ferrous salts, isoascorbic acid, sodium formaldehyde sulfoxalate, and the like.

Examples of emulsifiers or soaps suited to the polymerization processes of the present invention include alkali metal and ammonium salts of alkyl, aryl, alkaryl, and aralkyl sulfonates, sulfates, and polyether sulfates, fatty acids, ethoxylated fatty acids, esters, alchols, amines, amides, alkyl phenols, complex organo-phosphoric acids and their alkali metal and ammonium salts.

Chain transfer agents, including mercaptans, polymercaptans, and polyhalogen compounds are often desirable in the polymerization mix.

Thus, the composite interpolymer of the present invention is comprised of two discrete component phases chemically and/or physically linked together. Because of the extreme complexity of the interrelations among the various ingredients, it is difficult and possibly meaningless to refer to the physical characteristics of the component phases. Because of the degree of crosslinking in the elastomer phase and the participation of residual unsaturation of the elastomer in the polymerization of the rigid phase, no adequate or meaningful determination of molecular weight can be ascertained. A portion of the rigid phase is chemically bound to the elastomer; and an additional portion is not. Extraction of the composite interpolymer permits determination that the unattached portion of the rigid phase has a measurable molecular weight, which varies with the amount of rigid phase and the nature of the polymerization procedure, and which can ordinarily vary from about 40,000 up to as much as 500,000 or even more. The elastomer portion has been ascertained to generally have a swelling ratio (weight of wet acetone extracted, insoluble gel/weight of dry acetone extracted gel) ranging from about 2 to 12, while the unextractable portion of the interpolymer as a whole has a swelling ratio on the order of about 6 to 16.

Reference has heretofore been made to the polymerization of the rigid phase at or onto the surface of the elastomeric phase. When such references occur herein, it should be understood that such terminology is adopted for purposes of convenience and is believed to be not entirely descriptive of the results attained. While the phenomena involved are not so clearly understood that the following considerations should be considered binding, it does appear that the rigid phase monomers penetrate and swell the elastomeric phase particles to some extent and are polymerized in the interior thereof. Since such effects undesirably interfere with the impact properties, polymerization conditions are preferred which tend to minimize penetration. The more rapid the polymerization of the rigid phase monomers, the less time is available for penetration to occur. Accordingly, relatively large amounts of initiator, relatively high temperatures, and relatively slow additions of the rigid phase monomers are preferred to minimize penetration. Even when such preferred conditions are observed, some penetration will still occur, but will not be so large an element in determining the properties of the composite. It is theoretically desirable, as well, to insure that encapsulation of the elastomer phase by the rigid phase occurs; whether such an effect is in fact attained by observance of the preferred conditions has not been ascertained but the conditions are not inconsistent with such a result, at least where relatively large proportions of the rigid phase are employed.

By control of the polymerization variables, it is possible to control the particle size of the elastomer in the fashion well known to the art. The particle size is not of narrow significance to the present invention, and can range from as low as about 500Å, or even less, up to as large as about 3000Å or more.

The blend of the composite interpolymer and the polycarbonamide can be accomplished by any known method. The blend can be prepared by mixing the relatively dry coagulated or spray dried composite interpolymer with nylon chip or fiber flock and the resulting blend can be milled to form a well dispersed mixture in an extruder, a roll mill, or like equipment whereupon the blend can be extruded into sheet or shapes or can be blown into film, can be spun into fiber, or can be granulated and used for injection molding.

During the milling operation the heat used therein and/or produced thereby causes some of the carboxylic acid groups of the modifier to react with some of the amine end groups of the polycarbonamide so that covalent carbonamide linkages form between the modifier and the polycarbonamide. This reaction can conveniently be followed by the reduction in amine end groups as determined by titration such as with perchloric acid in phenol-methanol mixed solvent.

Another convenient method of blending the composite and the carbonamide is by mixing the composite latex dispersion or solution with polycarbonamide fiber flock and milling to form a well dispersed mixture in a vacuum vented extruder or on a roll mill whereby the dispersing medium or solvent is removed during the blending of the composite and the polycarbonamide. The interpolymer latex dispersion or solution can also be added to the polycarbonamide melt in an extruder with removal of the dispersing medium or solvent as liquid and/or vapor.

The preferred method is to blend composite latex solution or dispersion with polycarbonamide flock of average length ⅛"–½", said flock being prepared and having insufficient hot strength to be extrudable under conditions normally used for thermoplastic resins; the latex-flock blend is passed through a vacuum vented extruder at elevated temperature or is milled on a heated roll mill whereby the solvent or dispersing medium, usually water, is removed during the blending of the composite and the polycarbonamide. Alternatively coagulated, drum-dried, or spray dried modifier can be blended with the "waste" flock and extruded or milled.

It is normal practice to include in such compositions compounds and materials which stabilize the products and inhibit oxidative, thermal, and ultraviolet light degradation. Such practices are contemplated within the scope of the present invention, and appropriate stabilizers are ordinarily incorporated into the composite interpolymer and into blends of the composite interpolymer with nylon. Stabilizers can be included at any stage from the polymerization process whereby the composite and/or the materials with which the composite is blended are formed to the final step of forming the final product. It is preferred that stabilizers be included early in the life of such polymers to preclude the initiation of degradation before the material can be protected. Accordingly, the preferred practice is to include stabilizers in the polymerization process, if compatible therewith, or in the polymer latex resulting from the polymerization.

The oxidative and thermal stabilizers useful in the materials of the present invention include those used in addition polymers generally. They include, for example, hindered phenols, hydroquinones, phosphites, and varieties of substituted members of those groups and combinations thereof.

The ultraviolet light stabilizers can also be those used in addition polymers generally. Examples of ultraviolet light stabilizers include various substituted resorcinols, salicylates, benzotriazoles, benzophenones, and the like.

Other inclusions in the materials of the present invention include lubricants, such as stearic acid, stearic alcohol, eicosanol, and other known types; colorants, including organic dyes, such as anthraquinone red and the like, organic pigments and lakes, such as phthalocyanine blue and the like; and inorganic pigments, such as titanium dioxide, cadmium sulfide, and the like, fillers and particulate extenders, such as carbon black, amorphous silica, asbestos, glass fibers, magnesium carbonate, and the like; plasticizers, such as dioctyl phthalate, dibenzyl phthalate, butyl benzyl phthalate, hydrocarbon oils, and the like.

While only a few of such materials have been specifically recited, it is not intended to exclude others; the recitation is exemplary only, and each category of additive is common and well known in the art, including extremely large numbers of materials which are equally well suited for inclusion in the materials of the present invention.

Such inclusions in the materials of the present invention can be made at any stage of preparation, in accordance with techniques well known to those of ordinary skill in the art, in proportions which are commonly employed. Such additional materials are not of particular significance in the present invention and form no part thereof.

To assist those skilled in the art in the practice of the present invention, the following modes of operation are set forth as illustrations, parts and percentages being by weight unless otherwise specifically noted:

EXAMPLES 1 to 9

Acrylic elastomer-based interpolymer compositions are prepared in accordance with the following procedure:

An elastomer monomer charge is emulsified, using an alkali metal salt of dodecylbenzene sulfonic acid as the emulsifier. About 20 percent of the monomer charge is polymerized with an alkali metal persulfate at elevated temperature to form a "seed." The remainder of the elastomer monomer charge, with the further inclusion of other monomers, as appropriate, is then added and polymerized, substantially to completion, while controlling the soap or emulsifier concentration to prevent the formation of a significant number of new particles. The resultant polymer is retained in emulsion form and an increment of appropriate monomers is polymerized onto the particles to form a subsequent stage of a rigid thermoplastic containing copolymerized acid. The composite interpolymer (representing the sequentially polymerized elastomer and rigid thermoplastic) is isolated from the emulsion by spray drying or the emulsion is used per se. The seed technique affords effective control of the particle size, but, of course, is necessary only to the preparation of relatively large size particles. For small particle sizes, a single stage polymerization of the elastomer can be utilized. The composite is blended with an appropriate polycarbonamide by the method designated and is extruded at the melt temperature shown in the table. The extruded strands are chopped into granules and the granules are injection molded into test speciments.

Nine different compositions are prepared and tested in accordance with the above precedure, and the results are reported in Table I. The elastomers in the example all comprise a major amount of butyl acrylate, a minor, but still substantial proportion of styrene, and minor amounts of ethylthioethyl methacrylate and 1,3-butylene diacrylate or 1,3-butylene dimethylacrylte. In Table I, these are designated for convenience, respectively, BA, S, ETEMA, BDA, and BDMA. Other inclusions, and their respectively abbreviations appearing in the table, are allyl methacrylate (ALMA), allyl acrylate (ALA), diallyl maleate (DALM), methyl methacrylate (MMA), acrylic acid (AA), methacrylic acid (MMA), and mercaptoethanol (ME). Another matter of convenience in the table is in the representation of the percentages of the components in the elastomer. The base components, i.e., BA, S, ETEMA, MMA, and acid total 100 parts by weight, and other inclusions are reported as a percentage by weight based on the foregoing components. In this manner, changes of composition are readily observed. In addition, a convenient "short hand" representation of composition and proportions is utilized. All the components of each phase are represented in the heading of the tabulation, separated by a single slash; components of different phases are separated by a double slash. All the modifier compositions are prepared by the seed technique, and conditions are controlled so that an average particle size of about 2000Å is attained.

All of the examples shown in Table I can be extruded into 10 mil or less sheet and the sheet can be vacuum thermoformed at 420°–450° F. and plug molded when the specimens are heated for 3 minutes at 450° F. The unmodified nylons can not be extruded into sheet under the same conditions as they lack hot strength and drool at the die lip.

TABLE I

| Example No.[1] | | 1 | 2 | | 3 | |
|---|---|---|---|---|---|---|
| Polycarbonamide type[2] | B | B | B | A | A | C |
| Modifier Level | 0 | 25 | 10 | C | 15 | 0 |
| Second Pass Melt Temperature, ° C. | | 275–282 | 280–282 | | 298–304 | |
| Type of Blend[3] | | Dry | Dry | | Dry | |
| Izod Notched Impact Strength | | | | | | |
| ⅛" Bar, Milled Notch, 23° C. | 1.1 | 2.2 | 3.1 | | | 0.94 |
| ⅛" Bar, Molded Notch, 23° C. | 0.6 | 1.6 | 1.4 | | | 0.95 |
| ¼" Bar, Milled Notch, 23° C. | 1.1 | 3.7 | 2.1 | 0.97 | 3.3 | 1.0 |
| ⅛" Bar, Milled Notch, 23° C. | 0.9 | 1.7 | 1.7 | 0.48 | 2.0 | 0.8 |
| ⅛" Bar, Milled Notch, −40° C. | 0.4 | 0.3 | 0.3 | | | 0.6 |
| ⅛" Bar, Molded Notch, 23° C. | 1.0 | 4.4 | 2.4 | | | 1.2 |
| ⅛" Bar, Molded Notch, 0° C. | 0.5 | 1.4 | 1.9 | | | 0.6 |
| ⅛" Bar, Molded Notch, −40° C. | 0.3 | 0.6 | 0.7 | | | 0.5 |
| Tensile Impact, 23° C., 11/1, ft.-lb./in.$^2$ | 150/103 | 221/68 | 175/74 | 43/45 | 188/124 | 37/136 |
| DTUL, ° C. at 66 psi | 191 | 175 | 186 | | | 193 |
| at 85 psi | | | | 175 | 160 | 169 |
| at 264 psi | 66 | 59 | | | | |
| Rockwell Hardness, L Scale | 99.5 | 78.5 | 90.5 | 99.0 | 86.0 | 98.0 |
| VICAT Temp., ° C., 10 mils | 202 | 201 | 207 | | | |
| Tensile Strength | | | | | | |
| % Elong. at Yield (Dry/Wet) | 4.3/4.4 | 4.2/3.9 | 3.9/3.3 | 4.2/— | 4.1/— | 3.8/— |
| % Elong. at Break | 38.2 | 103 | 93.4 | | | |
| STRESS at Yield (Dry/Wet), psi | 11,300/7,200 | 7,200/3,400 | 9,600/4,800 | 9,600/— | 6,700/— | 9,500/— |
| STRESS at Break, psi | >10,000 | 7,200 | 9,000 | | | |
| MODULUS (Dry/Wet), psi × 10$^{-5}$ | 4.1/2.7 | 3.1/1.5 | 4.3/2.2 | 4.6/— | 3.0/— | 4.3/— |
| Water absorption, % at 23° C. | | | | | | |
| 1 Day | 2.0 | | | | | |
| 1 Week | 5.5 | 4.2 | 4.6 | | | 5.0 |

TABLE I-continued

| AMINE CONTENT:MEQ./KG. | 49 | 13 | 11 | 58 | 13 | 155 |
|---|---|---|---|---|---|---|
| Example No.[1] | 4 | 5 | 6 | 7 | 8 | 9 |
| Polycarbonamide Type[2] | C | C | C | C | C | C |
| Modified Level | 7.5 | 5.7 | 4.5 | 4.5 | 2.75 | 6.67 |
| Second Pass Melt Temperature, °C. | 284–286 | 279 | 282 | | 282 | 295–297 |
| Type of Blend[3] | Dry | Wet | Wet | Wet | Dry | Dry |
| Izod Notched Impact Strength | | | | | | |
| ¼" Bar, Milled Notch, 23° C. | 2.0 | 1.9 | 2.0 | 2.0 | | |
| ¼" Bar, Molded Notch, 23° C. | 1.1 | 1.7 | 1.4 | 1.8 | | |
| ⅛" Bar, Milled Notch, 23° C. | 2.4 | 2.9 | 3.2 | 4.2 | 2.1 | 2.5 |
| ⅛" Bar, Milled Notch, 0° C. | 1.3 | 1.9 | 2.5 | 1.2 | | |
| ⅛" Bar, Milled Notch, −40° C. | 0.6 | 0.7 | 1.0 | 1.3 | | |
| ⅛" Bar, Molded Notch, 23° C. | 2.1 | 2.2 | 3.2 | 3.0 | | |
| ⅛" Bar, Molded Notch, 0° C. | 1.4 | 1.7 | 2.0 | 2.0 | | |
| ⅛" Bar, Molded Notch, −40° C. | 0.7 | 0.4 | 1.1 | 1.3 | | |
| Tensile Impact, 23° C., 11/1, hq-lb./in.$^2$ | 121/133 | 100/96 | 152/130 | 151/120 | | |
| DTUL, °C. at 66 psi | 181 | 177 | 167 | 188 | | |
| at 85 psi | 156 | 175 | 171 | 171 | | |
| at 264 psi | | | | | | |
| Rockwell Hardness, L Scale | 89.5 | 94.5 | 95.5 | 90.5 | | |
| VICAT Temp., °C., 10 mils | | | | | | |
| Tensile Strength | | | | | | |
| % Elong. at Yield (Dry/Wet) | 3.9/— | 3.4/— | 3.4/— | 3.4/— | | |
| % Elong. at Break | | | | | | |
| STRESS at Yield (Dry/Wet), psi | 8,200/— | 9,300/— | 9,700/— | 9,200/— | | |
| STRESS at Break, psi | | | | | | |
| MODULES (Dry/Wet), psi × $10^{-5}$ | 3.6/— | 4.6/— | 5.0/— | 4.3/— | 4.8/— | 4.2/— |
| Water Absorption, % at 23° C. | | | | | | |
| 1 Day | | | | | | |
| 1 Week | | 4.6 | 4.4 | 4.5 | | |
| AMINE CONTENT:MEQ./KG. | 20 | 19 | 19 | 15 | 19 | 13 |

Footnotes for Table I

[1] Example No. Modifier Composition

| | |
|---|---|
| 1 | BA/B/BDA/ALMA//MMA/AA = 57/13/0.35/0.14//28/2 |
| 2, 3, 4 | BA/S/ETEMA/BDA/ALMA//MMA/AA = 56.5/13/0.50/0.35/0.14//25/5 |
| 5 | BA/S/BDA/ALMA//MMA/MAA = 57/13/0.35/0.14//23/7 |
| 6 | BA/S/ETEMA/EDA/DALM//MMA/MAA = 56.5/13/0.50/0.35/0.14//21/9 |
| 7 | BA/S/EDA/ALMA//MMA/MAA/ME = 57/13/0.35/0.28//21/9/0.3 |
| 8 | BA/S/EDMA/ALA//MMA/MAA = 40/9.5/0.5/0.35/0.14//35/15 |
| 9 | BA/S/ETEMA/EDA/ALMA//MMA/ALMA//S/AA = 40/9.5/0.5/0.25/0.10//20/0.10//15/15 |

[2] Polycarbonamide

| | Relative Viscosity in 98% H$_2$SO$_4$ | Amine Content (meq./kg.) |
|---|---|---|
| A Nylon 6 | 2.37 | 58 |
| B " | 2.55 | 49 |
| C " | 2.50 | 55 |

[3] Type of Blend

Dry - Spray dried modifier tumble blended with nylon chips or granules.
Wet - Modifier latex blended with fiber flock.

Footnotes for Table II

[1] Example No. Modified Composition

| | |
|---|---|
| 10 | Bd/S//MMA/AA = 49.7/20.3//25/5 |
| 11, 12, 13, 14, 15 | Bd/S/MMA//MMA/AA = 52.5/14.8/2.7//25/5 |
| 16 | Bd/S/MMA//MMA/AA//S/AA = 37.5/10.6/1.9//20.0/0.10//20/10 |
| 17 | Bd//S/AA = 50//40/10 |

[2] Same as Table I
[3] Same at Table I

EXAMPLE 10

To 1168.6 parts of a commercial butadiene/styrene 71/29 latex (Firestone latex FR-S2003) containing 59.9% solids is added 1300 parts of water, 14 parts of sodium lauryl sulfate, 0.45 part cumene hydroperoxide, 165 parts of a 5% aqeous solution of acetic acid, and 0.6 part of sodium formaldehyde sulfoxalate. A mixture of 250 parts of methyl methacrylate, 50 parts of acrylic acid and 0.45 part cumene hydroperoxide is added to the latex during two hours, during which time the temperature rises from 30° C. to 41° C. At the end of the addition of the second stage, the mixture is heated at 65° C. for two hours to complete the polymerization. The final emulsion contains 34.0% solids. To this emulsion is added 70 parts of the following emulsion which stabilizes the latex against oxidation during spray drying:

2,6-di- tert-butyl-4-methylphenol—20.0 parts by weight
Methyl methacrylate—20.0 parts by weight
Sodium lauryl sulfate—4.0 parts by weight
Water—56.0 parts by weight The emulsion is then spray dried to give a free-flowing powder which can be blended with the polycarbonamide by tumble blending and double pass extrusion. The test samples are injection molded. The test results are shown in Table II.

EXAMPLES 11 to 16

Diene elastomer-based interpolymer compositions are prepared in accordance with the following procedure:

A seed latex is formed by polymerizing an emulsion of the following monomers in the proportions by weight as designated:
butadiene-1,3—75
styrene—21.2
methyl methacrylate—3.8

A redox initiator system composed of cumene hydroxperoxide and sodium formaldehyde sulfoxalate is used. The resulting latex has a particle size of about 900Å. To 10 parts of this latex are added 90 parts of a monomer mixture having the above shown composition using the same redox pair and with such an emulsifier concentration that essentially no new particles are formed. The resulting latex has a particle size of about 1700Å. The rigid thermoplastic stage containing the unsaturated carboxylic acid is now added in such a way that no new particles are formed—here, too, the initiator system is the abovementioned redox pair. To the final latex is added the following emulsion which stabilizes the latex against oxidation during spray drying:
2,6-di-tert-butyl-4-methylphenol—20.0 parts by weight
methyl methacrylate—20.0 parts by weight
Sodium lauryl sulfate—4.0 parts by weight
Water—56.0 parts by weight The emulsion is then spray dried to give a free-flowing powder which can be blended with the polycarbonamide by tumble blending and double pass extrusion. The test samples are injection molded.

Five different compositions are prepared and tested in accordance with the above procedure and the results are reported in Table II. The same "short hand" representation of composition and proportions as is used in Table I is utilized in Table II. These examples also can be extruded into sheet which is thermoformable and plug moldable.

EXAMPLE 17

To 836 parts of a commercial polybutadiene latex (Firestone latex FR-S2004) containing 59.8% solids is added 1500 parts of water, 10 parts of solution of acetic acid, and 2.5 parts sodium formaldehyde sulfoxalate and the mixture is heated to 50° C. A mixture of 400 parts of styrene, 100 parts of acrylic acid and 2.5 parts of cumene hydroperoxide is added to the latex over three hours during which time the temperature rises to 60.5° C. The emulsion is then heated at 65° C. for two hours to complete the polymerization. The final emulsion contains 33.6% solids. To this emulsion is added 50 parts of the stabilizer emulsion used in Example 10. The emulsion is blended with polycarbonamide flock in a Prodex-Henschel mixer and the resulting mixture is fed to a vacuum-vented, twin-screw extruder, whereupon it is reextruded through the same extruder and the pellets are injection molded to provide test samples. The results are reported in Table II.

TABLE II

| EXAMPLE NO.[1] | | 10 | 11 | 12 | | 13 | 14 | 15 | 16 | 17 |
|---|---|---|---|---|---|---|---|---|---|---|
| Mylon Type[2] | A | A | A | B | C | C | C | C | C | C |
| Modifier Level | 0 | 15 | 15 | 10 | 0 | 7.5 | 7.5 | 8.5 | 10 | 12.5 |
| Second Pass Melt Temperature, °C. | | 295-301 | 290-300 | 282-286 | | 285-288 | 278 | 290 | 275 | 287 |
| Type of Blend | | DRY | DRY | DRY | | DRY | WET | DRY | DRY | WET |
| IZOD Notched Impact Strength | | | | | | | | | | |
| 1/4" Bar, Milled Notch, 23° C. | | | 1.9 | | | 0.94 | 1.6 | | | |
| 1/4" Bar Molded Notch, 23° C. | | | 1.4 | | | 0.95 | 1.0 | | | |
| 1/6" Bar, Milled Notch, 23° C. | 0.97 | 2.1 | 2.1 | 1.9 | | 1.0 | 1.9 | 1.9 | 3.3 | 1.9 | 2.7 |
| 1/8" Bar, Milled Notch, 0° C. | 0.48 | 1.9 | 2.1 | | | 0.8 | 1.8 | | | |
| 1/8" Bar, Milled Notch, −40° C. | | | 0.9 | | | 0.6 | 0.8 | | | |
| 1/8" Bar, Molded Notch, 23° C. | | | 2.3 | | | 1.2 | 2.2 | | | |
| 1/8" Bar, Molded Notch, ° C. | | | 2.3 | | | 0.6 | 1.3 | | | |
| 1/8" Bar, Molded Notch, −40° C. | | | 1.2 | | | 0.5 | 0.8 | | | |
| Tensile Impact, 23° C. Ft.-lb./in.[2] | | 43/46 | 171/157 | 238/136 | | 37/136 | 177/173 | | | |
| DTUL, ° C. at 66 PSI | | | | 177 | | 193 | 197 | | | |
| at 85 PSI | | 175 | 149 | | | 169 | | | | |
| at 264 psi | | | | 60 | | | | | | |
| Rockwell Hardners, L Scale | | 99 | 87 | 91.5 | | 98 | 90.5 | | | |
| Vicat Temp., ° C, 10 Mils | | | | 100 | | | | | | |
| Tensile Strength | | | | | | | | | | |
| % Elong. at Yield (Dry/Wet) | | 4.2/— | 4.5/— | 3.6/4.6 | | 3.8/— | 4.1/— | | | |
| % Elong. at Break | | | | 177 | | | | | | |
| Stress at Yield (Dry/Wet), PSI | | 9,600/— | 7,100/— | 11,600/7,100 | | 9,500/— | 8,500/— | | | |
| Modulus (Dry/Wet) PSI × $10^{-5}$ | | 4.6/— | 3.4/— | 3.5–4.5/2.0–3.0 | 3.7/— | 4.3/— | 3.7/— | 3.2/— | 3.8/— | 4.2/— | 3.9/— |
| Water Absorption, % at 23° C. | | | | | | | | | | |
| 1 Week | | | | 4.4 | | | | | | |
| Amine content: meg./kg/ Blend | | 58 | 7 | 8 | 12 | 55 | 23 | | 27 | |

EXAMPLE 18

Pellets from Example 10 are blow extruded into film; the properties are shown in Table III.

EXAMPLE 19

Pellets from Example 2 are blow extruded into film and a portion of this film is uniaxially oriented on the Getty line. The properties are shown in Table III.

EXAMPLE 20

Pellets from Example 2 are melt spun into 80 denier fiber having the properties shown in Table IV.

EXAMPLE 21

Pellet from Example 10 are melt spun into 34 denier fiber having the properties shown in Table IV.

TABLE III

PERFORMANCE OF NYLON 6/ACRYLIC BLENDS
(films prepared by blow extrusion)

| Example No. | 18 | 19 | | | Capran 77C |
|---|---|---|---|---|---|
| Processing Data, Blown Film | | | | | |
| Die Temp., °F. | 430 | 435 | | | — |
| Melt Pressure at 115 rpm, psi | 2350 | 2200 | | | |
| Uniaxial Orientation: | | | | | |
| Roll Temp., °F. | — | — | 350 | — | 350 |
| Extension Ratio | Not oriented | Not oriented | 3.1 | Not oriented | 4.5 |
| Film Thickness, mils | 4 | 5 | 1 | 1 | 0.2 |
| Tensile Data, 50%/min. | | | | | |
| Strain, Yield, %, MD | 9 | 11 | 4* | 13 | ** |
| TD | 9 | 17 | 10 | 12 | 6 |
| Break, %, MD | 190 | 140 | 25 | 170 | 14 |
| TD | 270 | 230 | 80[1] | 180 | 20 |
| Strain, Yield, $10^3$ psi, MD | 3.9 | 4.4 | ** | 4.4 | ** |
| TD | 3.9 | 4.6 | 5.9 | 4.3 | 17.2 |
| Break, $10^3$ psi, MD | 9.8 | 8.9 | 28.7 | 5.1 | 66.6 |
| TD | 9.0 | 8.3 | 5.5 | 5.7 | 11.8 |
| Modulus, $10^3$ psi, MD | 0.93 | 1.0 | 1.9 | 0.93 | 7.6 |
| YTD | 1.1 | 1.2 | 2.2 | 0.95 | 7.4 |
| Toughness Factor, $10^3$ in./lb./in.$^2$ | | | | | |
| MD | 13 | 8.6 | 4.6 | 7.5 | 4.2 |
| TD | 16 | 14 | 4.3 | 7.7 | 2.7 |
| Tear Data (torn across MD) | | | | | |
| Tear Resistance, lb./mil | 1.4 | 1.4 | 3.6 | 11 | 1.4 |
| Work to Tear, in.-lb./mil | 0.71 | 0.78 | 0.43 | 1.5 | 0.86 |
| Tear Propgation Resistance, lb./mil | 0.14 | 0.13 | 0.23 | 0.41 | 0.17 |
| Work to Propagate Tear, in.-lb./mil | 0.26 | 0.25 | 0.47 | 0.94 | 0.30 |
| Brittle Point by Impact, °C, (across MD) | ←−35 | ←−43 | ←−35 | ←−35 | ←−33 |
| Dimensional Stability, change after | −1/0 | −2/0 | −10/+10 | 0/0 | −9/2 |
| Equilibrium Water Absorption | | | | | |
| 50% RH/77° F./4 days | 2.8 | 3.0 | 2.4 | 2.4 | — |
| 90% RH/77° F./4 days | 4.6 | 5.7 | 3.5 | 3.8 | 2.6 |
| Silvent Resistance, 7 days immersion | | | | | |
| at RT - Water, wt. increase, % | 6.7 | 6.7 | 6.1 | 6.7 | 10 |
| Motor oil, wt. increase, % | 1.0 | 1.1 | 2.4 | 4.7 | 44 |
| Veg. oil, wt. increase, % | 1.0 | 0.4 | 2.5 | 2.7 | 17 |
| $O_2$ Gas Transmission Rate, cm$^3$/100 in.$^2$/atm | 0.5 | 1.0 | — | 2.9 | 5.8 |

[1]Data badly scattered. Most of the values fell around 49% and 127% elongation at break.
*Allied 1 mil film.
**Sample broke before yielding.

EXAMPLE 22

A polyester from 98 parts of maleic anhydride, 1314 parts of adipic acid, and 620 parts of ethylene glycol is prepared in refluxing xylene. The xylene solution of the polyester is cooled to 80° C. and a mixture of 600 parts of styrene, 200 parts of acrylic acid, 4 parts t-dodecyl mercaptan and 16 parts of Lupersol 11 (a 75% solution of t-butyl peroxypivalate in mineral spirits) are added. The solution is heated at 80°-90° C. for a total of six hours with two increments of eight parts each of Lupersol 11 being added at two hour intervals. The resulting solution is added to polycarbonamide flock of relative viscosity 2.50 in 98% $H_2SO_4$ and of an amine content of 50 meq./kg., the polycarbonamide being present in a devolatilizing extruder as the melt, to give a final blend containing 15 parts of polyesterstyrene-acrylic acid modifier. This blend is extrudable and has impact strength greater than the nylon flock used to prepare it.

EXAMPLE 23

A polyether prepared from 120 parts of trimethylol propane and 5800 parts of propylene oxide is reacted with 522 parts of toluene diisocyanate and the product is reacted with 432 parts of hydroxypropyl methacrylate. This methacrylated poly (ether-urethane) is dissolved in a mixture of 3000 parts of methyl methacrylate and 860 parts of methacrylic acid and the monomers are polymerized with free radical catalysts by known methods. The resulting polymer is granulated and 20 parts of the granules are blended with 80 parts of the nylon flock used in Example 22; the blend is double pass extruded to give a material having higher impact strength than the nylon flock.

EXAMPLE 24

A mixture of 71.7 parts of a polyester from ethylene glycol, propylene glycol (ethylene glycol: propylene glycol=80:20) and adipic acid (hydroxyl terminated, molecular weight of approximately 2000), 3.0 parts of 1,3-butylene glycol, 1.3 parts of 1,4-butanediol, 0.02 parts of 2,6-di-tert-butyl-4-methylphenol, 186.9 parts of ethyl acetate, 0.5 part of Catalyst T-12 (di-butyltin dilaurate, M & T Chemicals, Inc.) and 24.1 parts of Hylene W (Du Pont, 4,4'bis (isocyanatocyclohexyl) methane) are heated at 50° C. whereupon 6.6 parts of hydroxyethyl methacrylate are added and the temperature is kept at 50° C. until the mixture no longer contains reactive isocyanate groups. To this solution is added a mixture of 40 parts of methyl methacrylate, 6 parts of methacrylic acid, 0.23 part t-dodecyl mercaptan, and 0.7 part of t-butyl peroxypivalate. The mixture is heated at 75° C. for three hours, an additional 0.35 part of t-butyl peroxypivalate being added 1.5 hours after reacing 75° C. The resulting solution of modifier is added to the same polycarbonamide as used in Example 22, the polycarbonamide being present in a devolatilizing extruder as the melt, to give a final blend containing 10% modifier. This blend is extrudable and gives an Izod notched impact strength of 2.0 ft. -lb./in. of notch (⅛" bar at 23° C.) and a tensile modulus of 390,000 psi dry.

EXAMPLE 25

A latex composition:
butadiene-1,3 — 75 parts by weight
styrene — 21.2 parts by weight
methyl methacrylate — 3.8 parts by weight is prepared in emulsion by the method used in Examples 11 to 14. To 70 parts of this elastomer is added 30 parts of the rigid thermoplastic stage of composition:
methyl methacrylate — 80 parts by weight
ethyl acrylate — 3.3 parts by weight
methacrylic acid — 16.7 parts by weight in such a way that no new particles are formed, using the same redox pair as is used in Examples 11–14. To the final latex is added sufficient stabilizer emulsion as described in Examples 11–14 to give 2%, 2,6-di-tert-butyl-4-methyl phenol on elastomer. The emulsion is spray dried and the free-flowing powder is blended with polyhexamethylene-adipamide, Zytol 101, to give a blend containing 25% modifier. The blend is double pass extruded. The Izod notched impact strength is 2.4 ft. -lb./in. of notch at 23° C. as compared to 0.8 ft. -lb./in. of notch for a comparable sample of unmodified Zytol 101.

EXAMPLE 26 the The of Example 25 is blended with Zytol 101 to give a blend containing 30% modifier. The blend is double pass extruded to give a material having a notched Izod impact strength of 4.7 ft. -lb./in. of notch at 23° C.

TABLE IV

| | TENSILE PROPERTIES OF MODIFIED NYLON 6 | | | | | |
|---|---|---|---|---|---|---|
| Example | Denier | Tenacity | Elongation at Break (%) | Initial Modulus (g./d.) | Work to Break (g.cm./ denier, cm.) | Stiffness (g./d.) |
| Example 20 | 80 | | | | | |
| Dry | | 4.03 | 12.4 | 26.8 | 0.50 | 0.27 |
| Wet | | 4.03 | 12.4 | 8.6 | 0.47 | 0.087 |
| % Change | | | | | | −54.7 |
| Example 21 | 34 | | | | | |
| Dry | | 2.99 | 19.2 | 17.5 | 0.67 | 0.21 |
| Wet | | 2.69 | 21.1 | 7.5 | 0.61 | 0.076 |
| % Change | | | | −56 | | −63.0 |
| Nylon 6 | 70/17 | | | | | |
| Dry | | 3.82 | 14.9 | 26.7 | 0.69 | 0.25 |
| Wet | | 3.20 | 20.7 | 8.4 | 0.72 | 0.11 |
| % Change | | | | −68.6 | | −56.0 |

What is claimed is:

1. A multi-phase polymer for modifying polycarbonamides comprising (A) a first elastomeric phase having a glass temperature less than 25° C. and polymerized from monomers comprising a major amount of an alkyl acrylate, a polyunsaturated crosslinking monomer having a plurality of addition polymerizable unsaturated groups, each of which participates in the polymerization reaction at about the same rate as one another, a graftlinking monomer having two or more addition polymerizable unsaturated reactive groups which participate in the polymerization reaction at substantially different rates, and (B) a final rigid phase having a glass temperature above 50° C. and containing amine-reactive carboxylic acid groups and polymerized from monomers comprising a major amount of a styrene and a minor amount of a copolymerizable carboxylic acid.

* * * * *